United States Patent
Keuning

(10) Patent No.: US 8,047,148 B2
(45) Date of Patent: Nov. 1, 2011

(54) SHIP

(75) Inventor: Jan Alexander Keuning, Willemstad (NL)

(73) Assignee: Technische Universiteit Delft (NL)

( * ) Notice: Subject to any disclaimer, the term of this patent is extended or adjusted under 35 U.S.C. 154(b) by 0 days.

(21) Appl. No.: 12/346,514

(22) Filed: Dec. 30, 2008

(65) Prior Publication Data

US 2009/0158989 A1 Jun. 25, 2009

Related U.S. Application Data

(63) Continuation of application No. PCT/EP2007/056614, filed on Jun. 30, 2007.

(30) Foreign Application Priority Data

Jun. 30, 2006 (EP) .................................... 06116487

(51) Int. Cl.
*B63B 1/00* (2006.01)
(52) U.S. Cl. .................................................... 114/61.27
(58) Field of Classification Search .................... 440/42; 114/61.27
See application file for complete search history.

(56) References Cited

U.S. PATENT DOCUMENTS

| 1,211,316 | A | | 1/1917 | Jantzen |
| 2,342,707 | A | | 2/1944 | Troyer |
| 2,363,335 | A | | 11/1944 | Katcher et al. |
| 3,889,623 | A | * | 6/1975 | Arnold ............................ 440/39 |
| 5,398,628 | A | * | 3/1995 | Rethorst ......................... 114/62 |
| 2003/0089290 | A1 | * | 5/2003 | Van Diepen ............... 114/61.27 |

FOREIGN PATENT DOCUMENTS

| DE | 2504254 B1 | 2/1976 |
| DE | 3539081 A1 | 4/1987 |
| GB | 2244458 A | 12/1991 |
| JP | 63312298 A | 12/1988 |
| WO | 2006018303 A1 | 2/2006 |

OTHER PUBLICATIONS

Keuning, et al.; 6th Symposium on High Speed Marine Vehicles; "Further Investigation into the Hydrodynamic Performance of the AXE Bow concept"; Sep. 18, 2002; 15 pages.
International Search Report and Written Opinion of the International Search Authority; PCT/EP2007/056614; Oct. 18, 2007; 8 pages.
Keuning, J.A.; Toxopeus, S.; Pinkster, J.; "The effect of bow-shape on the seakeeping performance of a fast monohull"; Proceedings of FAST 2001 conference, Sep. 4, 2001; p. 197-212; , publisher The Royal Institution of Naval Architects; 15 pages.

* cited by examiner

*Primary Examiner* — Stephen Avila
(74) *Attorney, Agent, or Firm* — St. Onge Steward Johnston & Reens LLC

(57) ABSTRACT

A ship designed for use at high speed and heavy seas having a single long and slender hull with a narrow beam and a more or less vertical bow, whereby the front half of the hull has more or less vertical sides, minimal flare in the bow sections and towards the bow an increase in draught at its center line combined with a more or less similar increase of freeboard and whereby the aft end of the hull has a flat or slightly V-shaped bottom with one or more propellers and/or water-jets as propulsion means. In accordance with the invention the bow has a fillet radius of at least 1% of the beam.

8 Claims, 3 Drawing Sheets

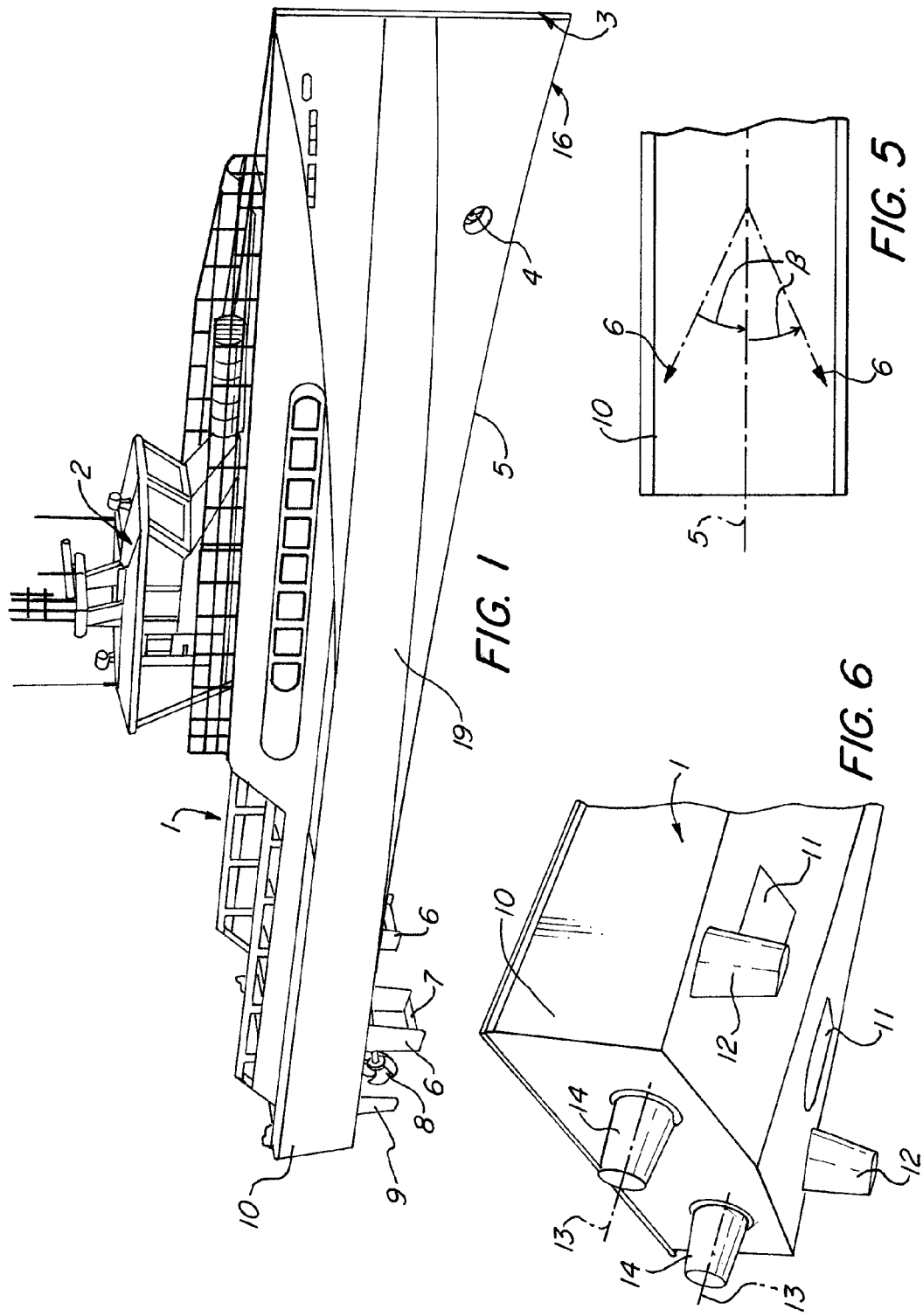

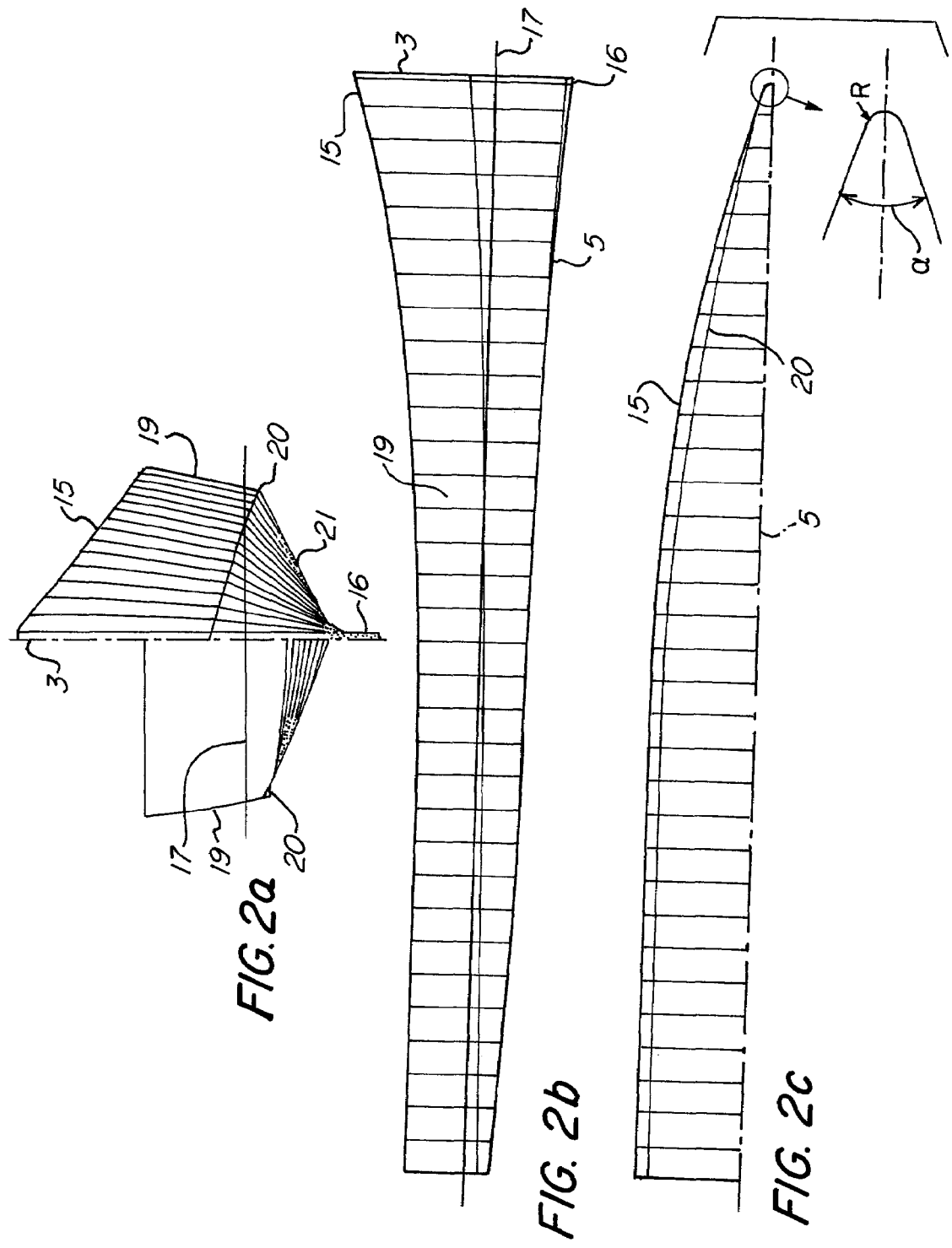

SHIP

CROSS-REFERENCE TO RELATED APPLICATIONS

The present application is a continuation of pending International patent application PCT/EP2007/056614 filed on Jun. 30, 2007 which designates the United States and claims priority from European Patent application 06116487.7 filed on Jun. 30, 2006, the content of which is incorporated herein by reference.

FIELD OF THE INVENTION

The invention concerns a ship designed for use at high speed and heavy seas having a single long and slender hull with a narrow beam and a more or less vertical bow, whereby the front half of the hull has more or less vertical sides, minimal flare in the bow sections and towards the bow an increase in draught at its center line combined with a more or less similar increase of freeboard and whereby the aft end of the hull has a flat or slightly V-shaped bottom with one or more propellers and/or waterjets as propulsion means characterized in that the bow has a fillet radius (R) of at least 1% of the beam.

BACKGROUND OF THE INVENTION

Such a ship is known from the publication Keuning, J. A.; Toxopeus, S.; Pinkster, J.; The effect of bow-shape on the seakeeping performance of a fast monohull; Proceedings of FAST 2001 conference, September 2001; page 197-206; ISBN 0 903055 70 8, publisher The Royal Institute of Naval Architects. In this publication the ship according to the invention is described as the AXE BOW design. The customary design of the vertical bow of the AXE BOW design which is specific for high speeds is with a sharp bow, which means the sides more or less intersect to a sharp nose that cuts in the water. The disadvantage of this customary design is that with small yaw angles this leads to vortex shedding near the bow and this has a disadvantageous effect on the course stability of the ship.

SUMMARY OF THE INVENTION

In order to overcome this disadvantage a ship is in accordance with the claims hereof, by giving the bow of this ship designed for high speeds a considerable radius the flow along the bow is more stable which improves the course stability at small yaw angles.

In accordance with another embodiment of the invention, excessive stagnation point resistance and spray generation are avoided.

In accordance with another embodiment of the invention, it is easy to obtain minimal flare in the bow sections so that the displaced volume in waves increases only more or less linearly with the draught and so leads to better ship behavior in waves.

In accordance with another embodiment of the invention, the fins give the ship improved course stability independent of any control system. The location of the fins forward of the propulsion means and the rudder(s) prevents aeration of the fins in situations whereby due to at the rear of the ship incoming waves the rudders lose their grip as a result of this aeration, thereby improving course stability under adverse conditions.

In accordance with another embodiment of the invention, by having the fins in a slight angle they are preloaded and are immediately active at small yaw angles, which improves their positive effect.

In accordance with another embodiment of the invention, the ship can be brought in a speed dependent trim position independent of the load or mass distribution in the ship, thereby reducing drag and improving propulsion efficiency.

In accordance with another embodiment of the invention, by using the flow direction out of the nozzles both for steering and creating the adjustable upward or downward force a compact design is possible.

In accordance with another embodiment of the invention, the combination of the stationary fins with the horizontal fin for generating the upward or downward force makes a compact design possible whereby due to the depth of the horizontal fin the aeration of the horizontal fin is prevented.

BRIEF DESCRIPTION OF THE DRAWINGS

The invention will be explained in more detail below with reference to several exemplary embodiments by means of a drawing, in which:

FIG. 1 shows a perspective view of a ship according a first embodiment of the invention, whereby the propulsion means includes propellers, FIG. 2 shows a body plan of the design of the ship according to the invention, whereby FIG. 2a shows the various cross sections, FIG. 2b shows the side view and FIG. 2c shows the bottom view, FIG. 5 shows schematically the bottom view of the aft of the ship of the previous embodiments and specifically the toe angle of the vertical fins, and FIG. 6 shows a perspective view of an aft ship according to an further embodiment of the invention, whereby the propulsion means include waterjets.

DETAILED DESCRIPTION OF THE INVENTION

Figure 3A:
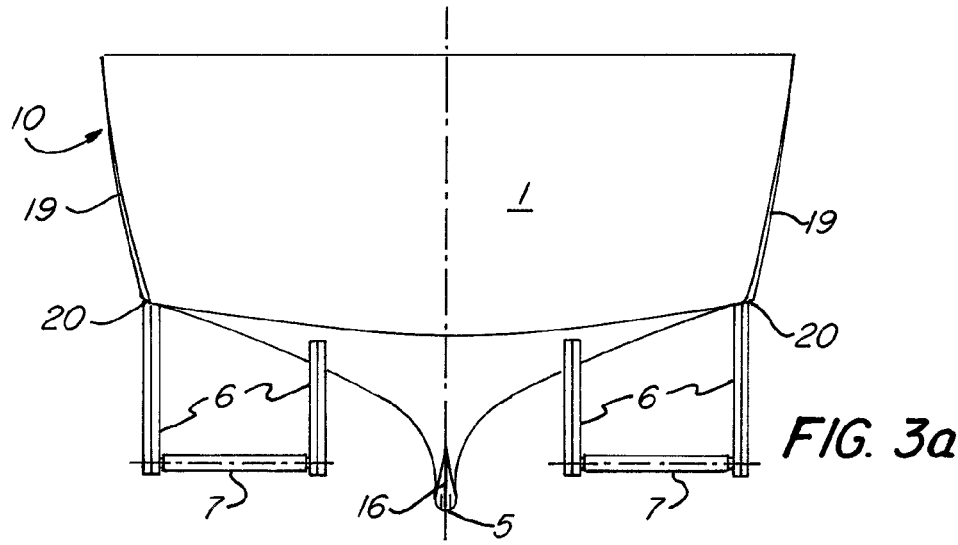
FIG. 3 shows schematically the aft of the ship in accordance with FIG. 1 in back view and inside view.

FIG. 1 shows a ship 1 which is designed in accordance with the body plan according to FIG. 2. The ship 1 is designed for high speeds and has a single long and slender hull with sides 19, whereby the length of the hull is at least five times the beam and for longer ships as much as seven to eight times the beam. In shorter ships the beam is relatively larger as the hull must include the propulsion means and a wider beam ensures that there remains sufficient stability. The ship 1 has one or more propellers 8 and one or more rudders 9. For maneuvering there is a bow thruster 4 near a bow 3. The lay out on deck is as usual for instance with a wheel house 2.

As can be seen in FIG. 2 the hull of the ship 1 has a special design, in more detail the design is such that a reduction of the Froude Kriloff forces in particular in the foreship is achieved by minimizing the change in momentaneous submerged volume of the hull whilst it makes larger relative motions relative to the water level due to waves or the ships motions. This results in a design applying vertical sides 19 as much as feasible. A further measure in the design is to reduce the change in waterline beam of the sections in particular in the foreship whilst it makes the foresaid larger relative motions. This implies there is a minimal flare in the bow sections and a bow 3 has a more or less vertical line or extends less than 5 degrees forward or backward. By doing so the change of the added mass of the sections is minimized and with that also the changes in the hydrodynamic lift in the foreship are minimized. By increasing the freeboard and bringing the deck line 15 higher towards the bow 3 in the foreship sufficient reserve buoyancy is guaranteed.

The amount of increased shear in the foreship, shown in FIG. 2 as deck line 15, is dependent on ship size, speed and wave climate involved. A downwards sloping centre line 5 towards the foreship prevents the sections there to leave and re-enter the water whilst the ship is performing larger relative motions. The centre line 5 is at it lowest near the bow 3 near point 16 which indicates the maximum draught relative to a waterline 17. The amount of negative slope in the bottom 21 is dependent on ship size, speed and wave climate involved. The deadrise angle of the sections from bow to stern is carefully determined in order to minimize exciting forces and yet maintain sufficient hydrodynamic lift with minimal resistance.

Summarized the shape of the hull is such that the hull is long and slender, there is no flare in the bow sections and the sides 19 at the bow sections are almost vertical. Near the bow 3 the sides 19 make an angle $\alpha$ seen in a horizontal plane which is smaller than 40 degrees. There is an increased sheer forward and down sloping centreline forward and the entry of the waterlines 20 are rounded. In order to reduce the wetted surface the bow 3 is rounded with a radius R of at least 0.1 m. Depending on the beam of the ship the radius can be at least 1% of the beam. A further advantage of this radius R is that vortex shedding along the sides 19 of the ship is avoided in this way. This vortex shedding might occur in this design at small yaw angles when the bow is too sharp as is usual with fast ships. The vortex shedding must be avoided as it might lead to course instability. In order to prevent that the rounded bow 3 generates too much stagnation point resistance and/or generates too much spray the radius R is less than 4% of the beam.

When applying this new hull shape further additional measures must be taken for maintaining adequate yaw or course keeping stability and to prevent undesirable control problems in particular in following or stern quartering waves. The hull itself generates destabilizing yaw and sway forces and moments which may lead to these instabilities. By the introduction of fixed vertical stabilizing fins or skegs 6 at the aft end of the hull these instabilities are prevented. The fins 6 preferably have airfoil type section shapes and have reasonable aspects ratios to generate adequate lift to counteract the destabilizing effects in yaw and sway of the hull. They are designed to optimize the yaw stability in particular at the cost of minimal increase in resistance. The fins 6 are located away from the center line 5 and preferably near the sides 19 so that they are away from the disturbed area in the water which is the result of the maximum draught 16 of the bow 3 which is much deeper in the water than an aft ship 10. Preferably they located in front of the rudders 9 and the propulsion means, so that they maintain grip on the flowing water even when the rudders 9 are aerated due to incoming waves from the stern quarter of the ship.

The restoring moment of the hull in pitch is relatively small when compared to similar craft. To a lesser extend this is also true for the restoring force in heave. The heave motion but in particular the pitch motion may be very effectively reduced by the application of one or more activated horizontal fins 7 at the aft ship 10. These fins 7 generate positive or negative lift and can be adjusted manually, if used only for trim control, or be controlled by (on board) sensors and control algorithms. In the embodiment of FIG. 1 there are two horizontal fins 7 which may work together and so bring forces on the aft ship 10 that counteract the heave and/or pitch of the ship 1 and can bring it in its optimal trim. In another embodiment the two horizontal fins 7 may be controlled in such a way that they create counter acting upward and downward forces and so create a torque in longitudinal direction on the ship 1 that counteracts rolling so that under proper control the stability can be improved.

The submerged horizontal fins 7, wetted on both sides, rely for the lift generation on both the high pressure and the suction side common for foils and they are preferably placed sufficiently deep below the water level to prevent ventilation or suction side cavitations along the fins 7. Specifically they can be used for active control of the trim angle in calm water dependent on the speed of the ship 1 in order to yield optimum attitude of the ship, for active control of the pitch and heave motion by auto pilot and control algorithm and also by applying differential steering for port and starboard horizontal fins the rolling motion can be controlled.

Figure 3B:
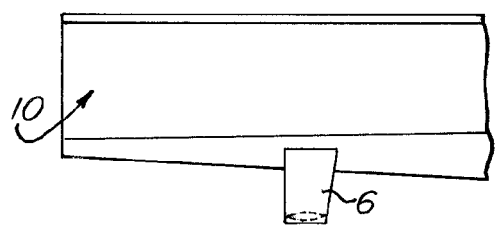

FIG. 3a shows the ship 1 of FIG. 1 in back view with the vertical fins 6 whereby on each side of the center line 5 two fins 6 are located and whereby between these two fins 6 one horizontal fin 7 is mounted. FIG. 3b shows the same inside view. For reasons of clarity the propellers 8 and the rudders 9 are not shown. As can be seen in FIG. 1 the propellers 8 and rudders 9 are located aft of the fins 6 and 7. It will be clear that for the propulsion of the ship 1 various designs are possible, such as three propellers 8 as shown in FIG. 1, two propellers, two propellers with one waterjet, one propeller with two waterjets and also two or more waterjets as shown in FIG. 6 (discussed hereafter).

Figure 4A:
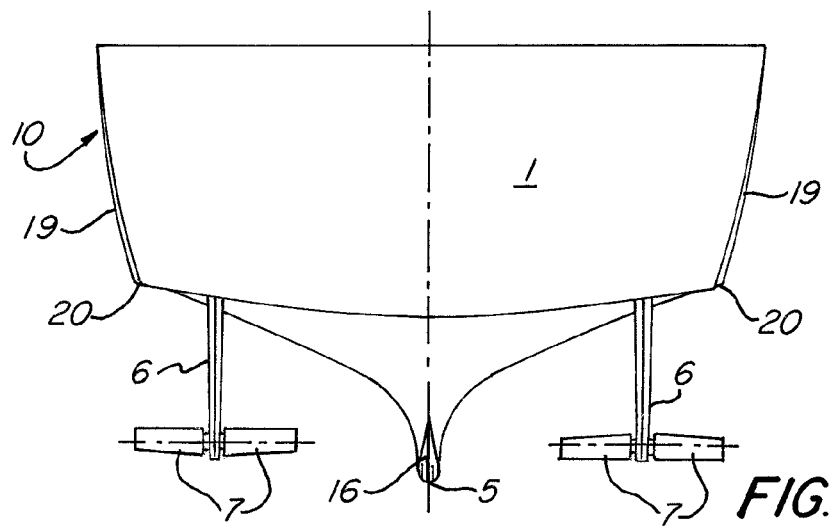
FIG. 4 shows schematically the aft of the ship in accordance with a further embodiment of the invention in back view and inside view.
Figure 4B:
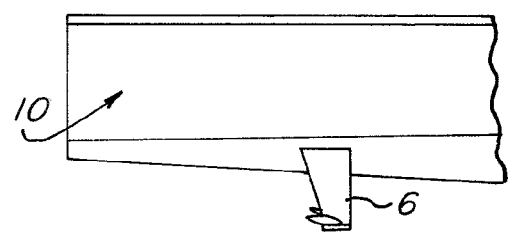

FIGS. 4a and 4b show similar views of a further embodiment of the vertical fins 6 and the horizontal fins 7. In this embodiment the horizontal fin 7 extends from both sides of the vertical fin 6. The vertical fin 6 is located slightly away from side 19 so that the horizontal fin 7 does not extend outside the beam of the ship 1. The two horizontal fins 7 extending to both sides of the vertical fin 6 have a common axis and are connected to a single drive so that they move together.

In the embodiment shown in FIG. 4 the horizontal fins 7 at starboard generate in a forward moving ship 1 an upwards directed force and the horizontal fins 7 at port generate a downwards directed force. These two forces form an anti-clockwise directed torque on the ship 1, which torque can be used to counteract forces that are for instance a consequence of waves.

The front edge of the vertical fins 6 is shown as more or less vertical as in this way the water flow around the blade is most effective for creating a stabilizing force. It will be clear that the same conditions will apply if the vertical fins 6 are for instance vertical to the plane of the underside of the ship 1, as long as the front edge of the fin is more or less perpendicular to the water flow relative to the fin 6. The front edge of the vertical fins 6 can also be slightly swept back so that material folded around the front edge is guided towards the fin's end and comes free of the fin. In the shown embodiments the vertical fins 6 are combined with horizontal fins 7. It will be clear that for proper functioning of the vertical blades 6 this is no requirement. FIG. 5 shows that the vertical fins 6 make a slight angle $\beta$ with the center line 5 so that when the ship 1 moves in a straight line forward there are stable flow conditions around the fin 6 in the length of the fin 6 seen in flow direction and a correcting force is immediately available if waves push against the aft ship 10 and change the flow direction towards the fin 6 and flow conditions around the fin 6. The value of angle $\beta$ depends on the local flow conditions and so on the shape of the underside of the ship 1. In practice the value of angle β may be between 1 and 3 degrees or approximate 1.5 degrees.

In the shown embodiments the blades of the horizontal fins 7 have a horizontal rotation axis, so ensuring similar aeration conditions along the length of the fin 7. Depending on the specific conditions this is not always essential. For instance in order to reduce flow resistance under normal conditions it might be advantageous to have the horizontal fin 7 seen perpendicular to the length parallel to the underside of the ship 1. In situations where there is no need to counteract the rolling of the ship 1 it is sufficient to have a horizontal fin 7 with a single drive, which can be over the full width of the ship 1 and which is only used for ensuring the proper trim of the ship 1. For stability this horizontal fin 7 can be supported in the center.

FIG. 6 shows the aft ship 10 of a further embodiment for which the hull is designed in similar way as in FIG. 1. The propulsion of the ship 1 in this embodiment is with waterjets. For course stability there are vertical fins 12, these vertical fins are more or less the same as the earlier discussed vertical fins 6 without the there added horizontal fins 7. In the underside of the ship there are water inlets 11 for intake of water that flows towards the waterjets and the water flows out of the nozzles 14 in the direction of a centre line 13. For steering the centre lines 13 can be moved in a known way in a horizontal plane. For generating upward and downwards forces on the aft ship 10 the centre lines 13 can be moved in a similar way in a vertical plane around a horizontal axis. The control of the direction of the centre lines 13 is arranged in a similar way as the control of the horizontal fins 7 and is preferably connected to an auto pilot for active control having a control algorithm and applicable sensors for determining positions and movements of the ship.

What is claimed is:

1. A ship designed for use at high speed and heavy seas having a single long and slender hull with a narrow beam and a substantially straight and substantially vertical bow, whereby the front half of the hull has vertical sides, minimal flare in the bow sections and, towards the bow, increase in draught at its center line combined with a similar increase of freeboard, and whereby the aft end of the hull has a flat or slightly V-shaped bottom with one or more propellers and/or waterjets propulsion means, characterized in that, in the horizontal plane, the bow has a fillet radius (R) of between 1% and 4% of the beam.

2. The ship according to claim 1 whereby, in the horizontal plane, the sides near the bow form a sharp angle (α) of less than 40 degrees.

3. The ship according to claim 1, said ship further having at least one rudder at the aft end of the hull, and in front of said rudder and the propulsion means near a side, at least one vertical stationary fin is mounted.

4. The ship according to claim 3 whereby the at least one vertical stationary fin makes, towards the bow, an angle (β) of 1-3 degrees with the center line.

5. The ship according to claim 1 whereby the hull has at the aft end of the hull adjustable force generating means for generating an upward and/or downward force.

6. The ship according to claim 5 whereby the adjustable force generating means are formed by nozzles of the waterjets.

7. The ship according to claim 5 whereby at the aft end of the hull in front of the rudder and the propulsion means near each side, at least one vertical stationary fin is mounted and the adjustable force generating means include at least one horizontal fin attached to the stationary fins near their maximum depth perpendicular to the ships center line, and said horizontal fin is rotatable around the longitudinal axis of the horizontal fin.

8. The ship according to claim 2, whereby at the aft end of the hull in front of the rudder and the propulsion means near each side at least one vertical stationary fin is mounted.

* * * * *